(12) United States Patent
Vemulapati et al.

(10) Patent No.: US 8,733,820 B2
(45) Date of Patent: May 27, 2014

(54) TRIM PANEL RETENTION ASSEMBLY

(75) Inventors: Satyanarayana Raju Vemulapati, Westland, MI (US); Kenneth S. Laird, Canton, MI (US); Paul Schryer, Farmington Hills, MI (US); Zhibing Deng, Northville, MI (US); Yun Shin Lee, Shelby Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/396,801

(22) Filed: Feb. 15, 2012

(65) Prior Publication Data
US 2013/0205546 A1   Aug. 15, 2013

(51) Int. Cl.
*B60J 7/00* (2006.01)
(52) U.S. Cl.
USPC ........................... 296/146.7; 296/39.1
(58) Field of Classification Search
USPC .............................. 296/146.7, 39.1
See application file for complete search history.

(56) References Cited

U.S. PATENT DOCUMENTS

| 7,726,726 | B2 * | 6/2010 | Cavallin et al. | 296/187.05 |
| 7,789,455 | B2 * | 9/2010 | Hall et al. | 296/187.05 |
| 2005/0206193 | A1 | 9/2005 | Sweers et al. | |
| 2009/0134659 | A1 * | 5/2009 | Hall et al. | 296/146.7 |
| 2009/0183436 | A1 | 7/2009 | Dry | |

FOREIGN PATENT DOCUMENTS

WO   2005049352 A1   6/2005

* cited by examiner

*Primary Examiner* — Joseph Pape
(74) *Attorney, Agent, or Firm* — Vichit Chea; Price Heneveld LLP

(57) ABSTRACT

A trim panel retention assembly for a vehicle includes a retention bracket mounted to an inner door panel and a trim panel bracket mounted to a door trim panel. The trim panel bracket is proximate and spaced from the retention bracket such that the retention bracket deters the trim panel bracket and door trim panel from detaching from the inner door panel during a side impact collision.

20 Claims, 7 Drawing Sheets

US 8,733,820 B2

TRIM PANEL RETENTION ASSEMBLY

FIELD OF THE INVENTION

The present invention generally relates to trim panels for vehicles, and more particularly to a trim panel retention assembly for retaining a trim panel to a door assembly during a side impact collision.

BACKGROUND OF THE INVENTION

Vehicle doors are typically constructed of two or more panels attached to a door frame, including a sheet metal outer panel that defines the door's exterior and a sheet metal inner panel secured to the door frame. Various door components are affixed to the door frame, including a window and window regulator, audio speakers, door locks, latches, and the like. A trim panel is fastened to the inner door panel to present an aesthetically pleasing appearance in the occupant compartment and to hide the internal components of the door assembly.

To lessen the effects of a side impact type collision on the vehicle occupant seating area, some vehicle door assemblies may include a door intrusion guard beam, side bolsters of foam or honeycomb construction, or other body side structural upgrades. Positioning of these devices also depends on the specific vehicle door design, but takes into account the special relationship of an occupant seating area adjacent the door. A side impact collision may cause localized deformation of the door, forcing the door and/or trim panel into the occupant seating area.

SUMMARY OF THE INVENTION

According to one aspect of the present invention, a trim panel retention assembly for a vehicle is provided. The trim panel retention assembly includes a retention bracket mounted to an inner door panel and a trim panel bracket mounted to a door trim panel. The trim panel bracket is proximate and spaced from the retention bracket such that the retention bracket hinders the trim panel bracket and door trim panel from detaching from the inner door panel during a side impact collision.

According to another aspect of the present invention, a trim panel retention assembly for a vehicle is provided. The trim panel retention assembly includes a retention bracket mounted to an inner door panel and having a stop portion and a trim panel bracket mounted to a door trim panel and having a leg portion. The stop portion and the leg portion are proximate and spaced, such that in a side impact collision the stop portion hinders the leg portion and the door trim panel from detaching from the inner door panel.

According to yet another aspect of the present invention, a trim panel retention assembly for a vehicle is provided. The trim panel retention assembly includes a retention bracket mounted to an inner body panel and a trim panel bracket mounted to a trim panel. The trim panel bracket is proximate and spaced from the retention bracket such that the retention bracket hinders the trim panel bracket and trim panel from detaching from the body panel during a vehicle collision.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 2:
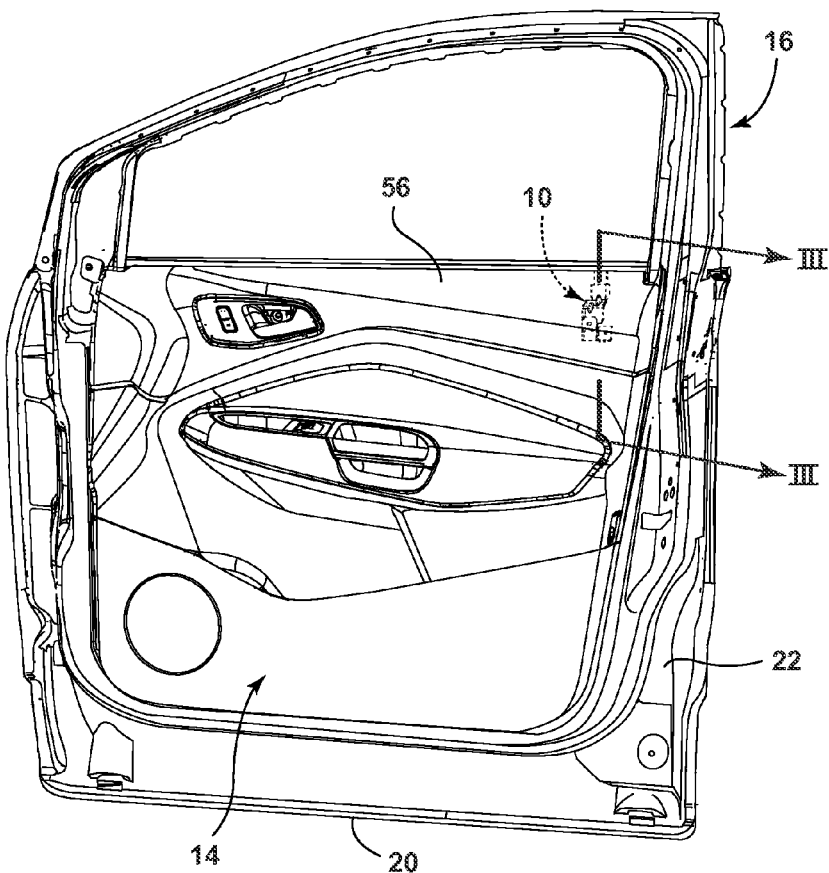
FIG. 2 is an interior perspective view of a door assembly of the vehicle of FIG. 1 and illustrating the trim panel retention assembly.

For purposes of description herein, the terms "upper," "lower," "right," "left," "rear," "front," "vertical," "horizontal," "interior," "exterior," and derivatives thereof shall relate to the invention as oriented in FIG. 2. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
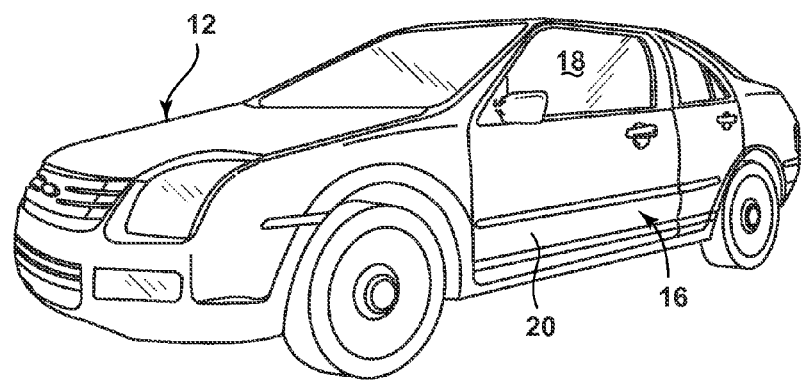
FIG. 1 is a perspective view of a vehicle having a trim panel retention assembly according to an embodiment of the present invention.

Referring to FIGS. 1 and 2, reference numeral 10 generally designates one embodiment of a trim panel retention assembly for use on an automotive vehicle 12. The trim panel retention assembly 10 is adapted to retain an interior trim panel 14 to vehicle structure, such as a door assembly 16. In the embodiment shown, the trim panel retention assembly 10 is located in a side door assembly 16 configured to retain an interior trim panel 14 during a vehicle 12 side impact. However, the trim panel retention assembly 10 can be employed to retain any interior trim panel disposed at a number of locations on the vehicle 12, including on front or rear doors, pillars, or any other interior location, so as to deter or aid in preventing the trim panel 14 from detaching from the vehicle structure in the event of a vehicle collision. To that end, the specific trim panel shown in FIG. 2 is for purposes of illustration and not by way of limitation.

The vehicle 12 includes an occupant compartment 18, defined by an interior of the vehicle 12. Trim components, such as the trim panel 14, help to define the occupant compartment 18 and, in the event of a vehicular crash, typically must meet requirements which limit intrusion into the occupant compartment 18.

Figure 3:
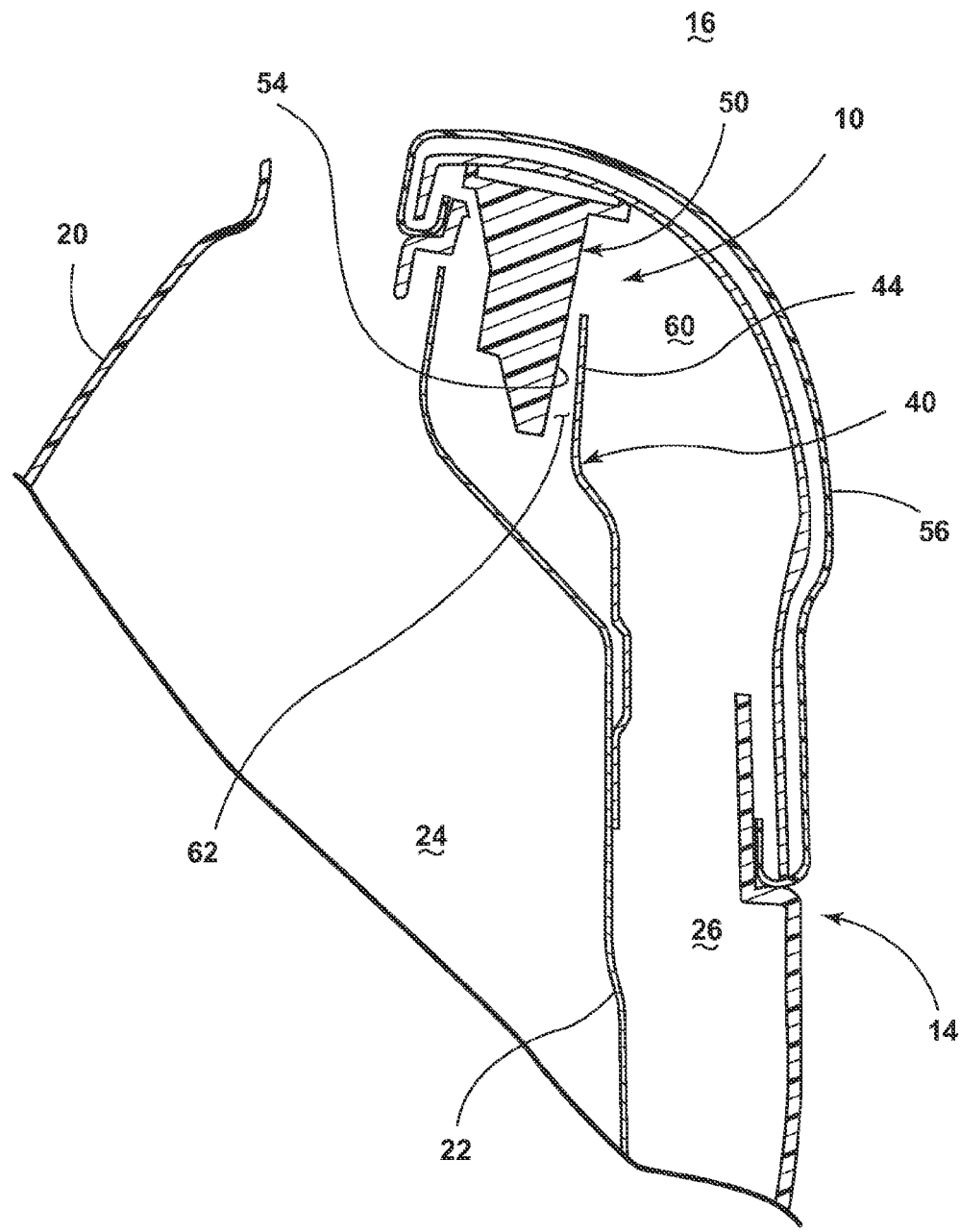
FIG. 3 is an enlarged sectional view, partially in elevation, of the door assembly and trim panel retention assembly, taken along line III-III of FIG. 2.

Referring additionally to FIG. 3, the door assembly 16 includes an outer door panel 20 and an inner door panel 22 joined together in conventional fashion. The outer door panel 20 and inner door panel 22 form a cavity 24 therebetween, and energy absorbing beams and structure, as well as a window regulator device, a door latch, and other components that may be mounted within the cavity 24. The outer door panel 20 and inner door panel 22 may be formed of a suitable metal material.

The trim panel 14 is mounted to the inner door panel 22 and is fixedly secured thereto by suitable fasteners, such as a conventional screw and clip arrangement. Other suitable fastening means may also be used, such as Christmas tree fasteners, push pins, or other fasteners generally known to those skilled in the art. Additionally, the trim panel 14 may be made of any suitable material, including plastic, cloth, vinyl, leather, carpeting, or a combination thereof. The trim panel 14 and inner door panel 22 form a cavity 26 therebetween.

Figure 4:
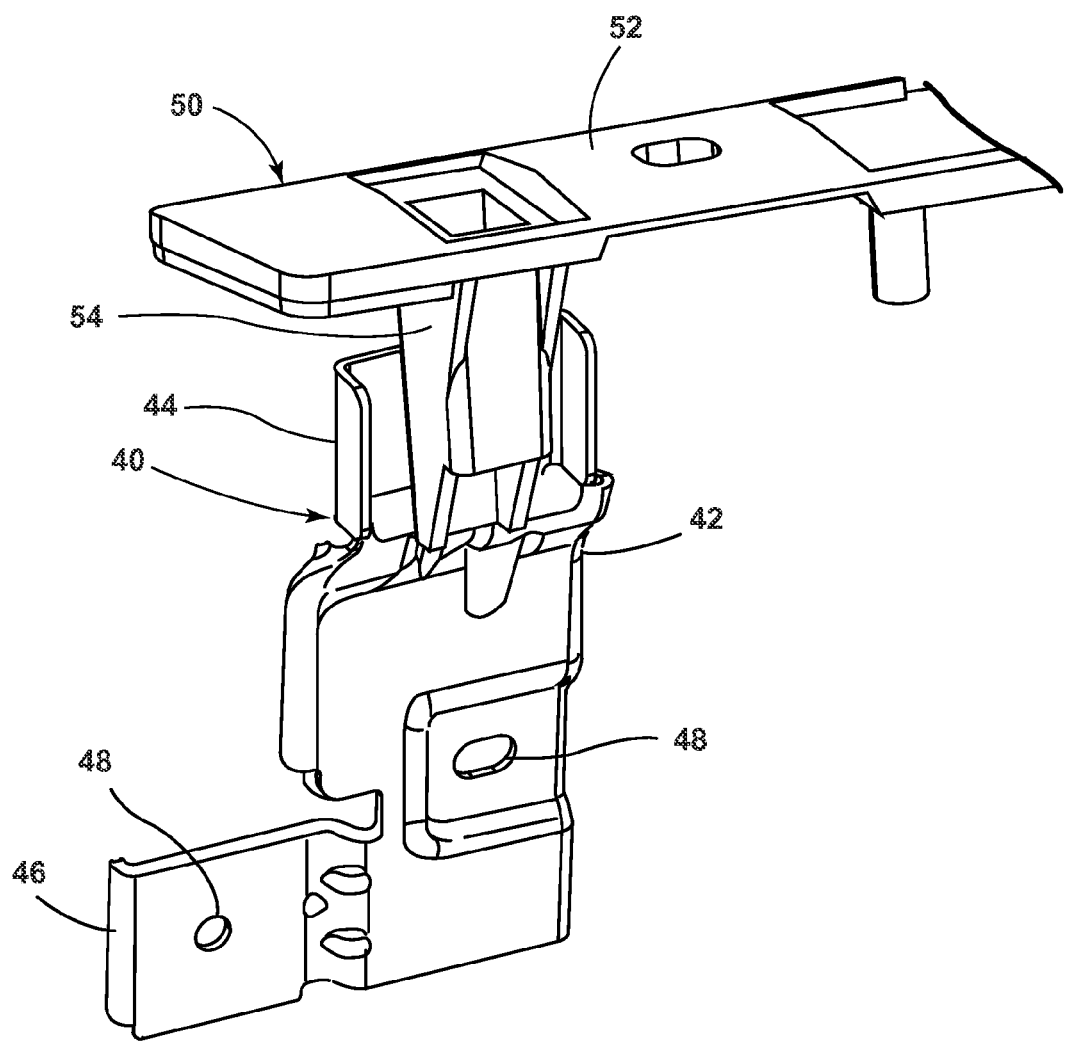
FIG. 4 is a perspective view of a retention bracket and a trim panel bracket of the trim panel retention assembly.
Figure 5:
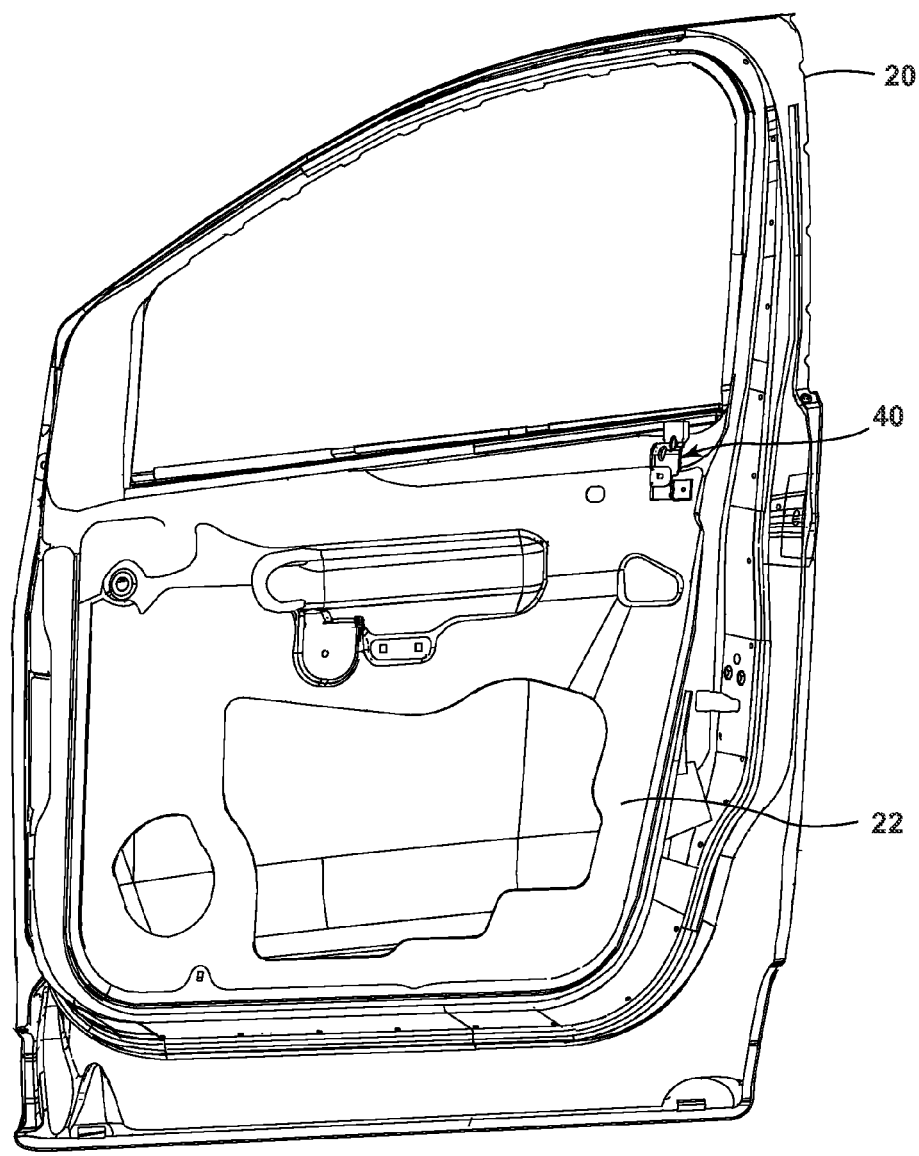
FIG. 5 is an interior perspective view of the door assembly and retention bracket, with a door trim panel removed for illustrative purposes.
Figure 6:
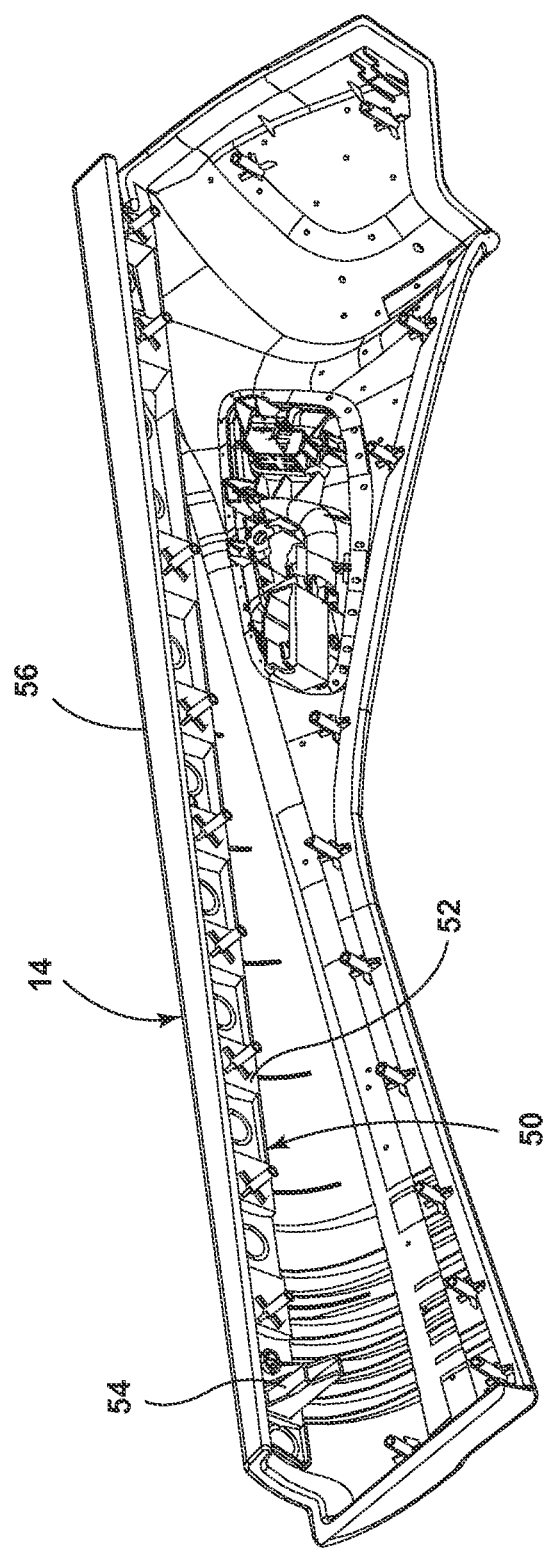
FIG. 6 is a bottom perspective view of a top portion of the door trim panel and trim panel bracket.
Figure 7:
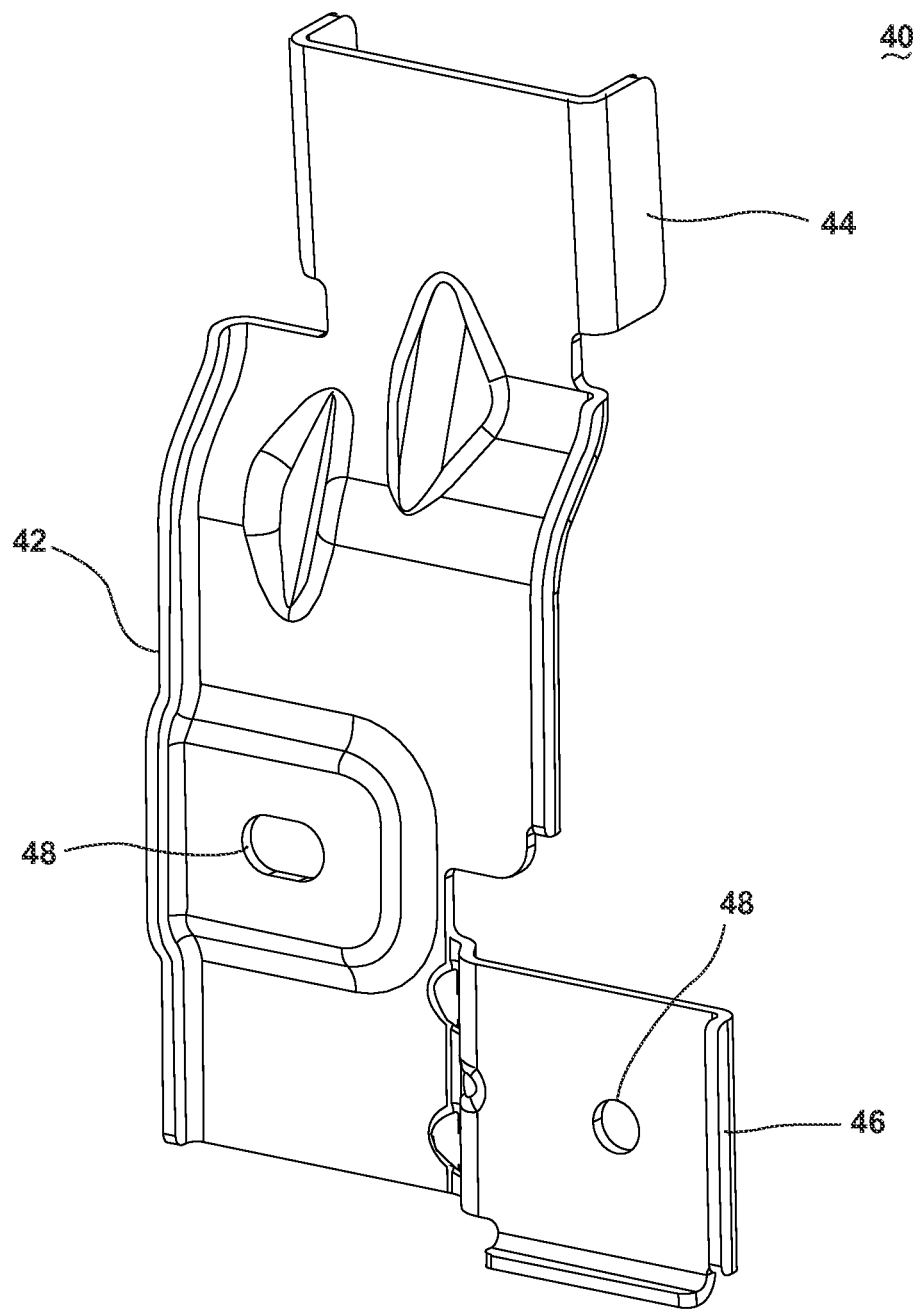
FIG. 7 is perspective view of the retention bracket.

Referring to FIGS. 4-6, the trim panel retention assembly 10 includes a retention bracket 40 mounted to the inner door panel 22 and a trim panel bracket 50 mounted to the door trim panel 14. The retention bracket 40 and trim panel bracket 50 are disposed within the cavity 26. Referring to FIG. 7, the retention bracket 40 is a unitary, substantially rectilinear member having a main body portion 42, a stop portion 44, and an attachment leg 46. In the illustrated example, the stop portion 44 extends substantially vertically up from the body portion 42, and the attachment leg 46 extends substantially horizontally out from the body portion 42. The retention bracket 40 includes at least one, shown as a pair, aperture(s) 48 which receive fasteners to secure the retention bracket 40 to the inner door panel 22. The retention bracket 40 can be rigidly affixed to the inner door panel 22 by any suitable means, including a threaded fastener(s) such as a screw(s). Additionally, the retention bracket 40 is adapted to complement the shape of the inner door panel 22, allowing attachment thereto. The retention bracket 40 may be made of metal, hard plastic, or any other suitable rigid material.

Figure 8:
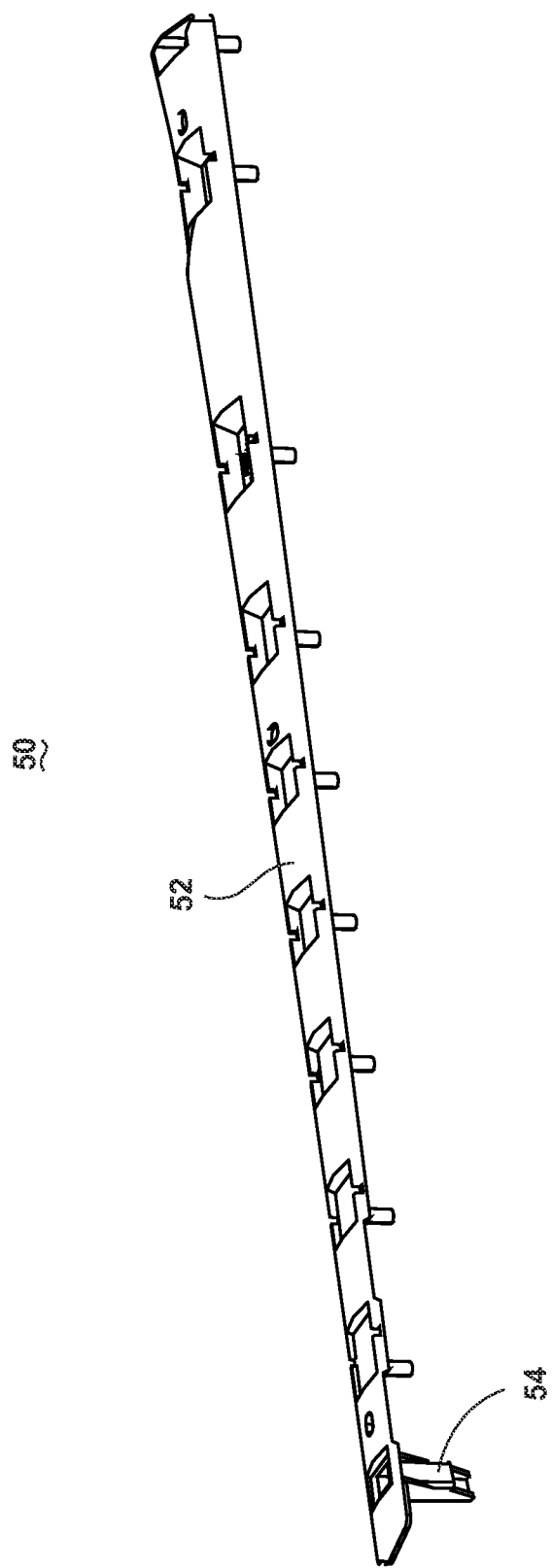
FIG. 8 is a perspective view of the trim panel bracket.

Referring to FIG. 8, the trim panel bracket 50 is also a unitary, substantially rectilinear member having a main body portion 52 and a leg portion 54. In the illustrated example, the leg portion 54 extends substantially vertically down from the main body portion 52. The main body portion 52 is elongate and extends along the inner surface of a top portion 56 of the door trim panel 14. The main body portion 52 is rigidly affixed to the inner surface of the door trim panel 14 by any suitable means, including threaded fasteners, welding, or sonic welding. The trim panel bracket 50 may be made of metal, hard plastic, or any other suitable rigid material.

With the door trim panel 14 assembled to the inner door panel 22, the retention bracket 40 and trim panel bracket 50 are proximate and spaced from one another. The trim panel bracket 50 is located opposite the retention bracket 40. The stop portion 44 of the retention bracket 40 partially extends up into an upper portion 60 of the cavity 26. Oppositely, the leg portion 54 of the trim panel bracket 50 extends down into the upper portion 60 of the cavity 26.

As best seen in FIG. 3, the stop and leg portions 44, 54 of the retention and trim panel brackets 40, 50 are aligned, but there is a gap 62 therebetween. The gap 62 is intentional and is designed and sized to allow clearance between the retention and trim panel brackets 40, 50. Several design criteria are considered when designing the related components and the gap 62. For example, the ability to assemble the trim panel 14 to the inner door panel 22 without the retention and trim panel brackets 40, 50 interfering should be considered. Also, the proximity of other nearby components, such as the beltline molding, as well as the shape of the inner door panel 22 are factors that also figure in to the designed gap 62. Taking these, and other, factors into consideration, the gap 62 is designed to a minimum. In other words, the distance between the retention and trim panel brackets 40, 50 is kept to a feasible minimum. Additionally, as should be understood by those having knowledge in the art, the exact shape, location, and design of the components may vary from vehicle to vehicle.

In operation, the vehicle 12 may be subject to a collision, such as a side impact collision. A side impact collision may cause lateral displacement of the outer door panel 20 toward the inner door panel 22. When the impact is great enough, the inner door panel 22 and trim panel 14 may also be laterally displaced, and together they may shift a distance into the occupant compartment 18. As the trim panel 14 is mounted to the inner door panel 22, the trim panel 14 generally will be displaced substantially the same distance as the inner door panel 22. Due to the spaced relationship between the retention bracket 40 and trim panel bracket 50, the trim panel 14 is able to travel a small distance, equivalent to the gap 62, further into the occupant compartment 18 than the inner door panel 22. However, the distance of the gap 62 is minimal so the additional intrusion into the occupant compartment 18 is slight.

In a side impact collision, the door trim panel 14 may be forced to shift a distance, equal to the gap 62, as previously stated. However, when the leg portion 54 of the trim panel bracket 50 contacts the stop portion 44 of the retention bracket 40, further shift of the trim panel 14 is prevented. This deters or helps prevent the trim panel 14 from becoming detached from the inner door panel 22 and further intruding into the occupant compartment 18, potentially impeding the deployment of a seat-mounted side airbag. Advantageously, the retention bracket 40 prevents the trim panel bracket 50 from shifting further, therefore deterring or preventing the door trim panel 14 from detaching from the inner door panel 22.

Another benefit of the trim panel retention system 10 is that the retention bracket 40 and trim panel bracket 50 do not negatively affect the craftsmanship of the door assembly 16. The retention and trim panel brackets 40, 50 are positioned between the inner door panel 22 and the door trim panel 14 and are not visible from within the occupant compartment 18 of the vehicle 12. This enables the desired functionality described above, without degrading the craftsmanship of the door assembly 16. Also, the trim panel retention system 10 does not affect the serviceability requirement that automotive manufacturers may be required to meet. Some current solutions use an additional screw to secure the door trim to the inner door panel 22, which necessitates extra assembly steps and an A-surface screw cover, neither of which are desirable from a manufacturing or craftsmanship standpoint.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle trim panel retention assembly, comprising:
   an inner door panel including a retention bracket having a stop portion with a free end; and
   a door trim panel mounted to the inner door panel and having a trim panel bracket with a leg portion, wherein the leg portion is spaced from the stop portion and the stop portion is positioned between the leg portion and the door trim panel.

2. The vehicle trim panel retention assembly of claim 1, wherein the stop portion is configured to extend upwards from the retention bracket and the leg portion is configured to extend downwards from the trim panel bracket.

3. The vehicle trim panel retention assembly of claim 2, wherein the stop portion is aligned and proximately spaced from the leg portion.

4. The vehicle trim panel retention assembly of claim 3, wherein during a side impact collision, the door trim panel and trim panel bracket may be laterally displaced into a vehicle occupant compartment, resulting in the leg portion of the trim panel bracket contacting the stop portion of the retention bracket.

5. The vehicle trim panel retention assembly of claim 4, wherein the contact between the leg portion and the stop portion deters the door trim panel from becoming detached from the inner door panel and being further displaced into the vehicle occupant compartment of the vehicle during the side impact collision.

6. The vehicle trim panel retention assembly of claim wherein the retention bracket further comprises a body portion and an attachment leg, wherein the stop portion extends substantially vertically up from the body portion and the attachment leg extends substantially horizontally out from the body portion.

7. The vehicle trim panel retention assembly of claim 1, wherein the trim panel bracket further comprises a main body portion, wherein the leg portion extends substantially vertically down from the main body portion and the main body portion is elongate and extends along an inner surface of a top portion of the door trim panel.

8. The vehicle trim panel retention assembly of claim 1, wherein the retention bracket and the trim panel bracket are positioned between the inner door panel and the door trim panel and are not visible from an occupant compartment of the vehicle.

9. A vehicle trim panel retention assembly, comprising:
an inner door panel including a retention bracket having an upward extending stop portion with a free end; and
a door trim panel mounted to the inner door panel and having a trim panel bracket with a downward extending leg portion, wherein the leg portion is proximately spaced from the stop portion and the stop portion is positioned between the leg portion and the door trim panel.

10. The vehicle trim panel retention assembly of claim 9, wherein during a side impact collision, the door trim panel and trim panel bracket may be laterally displaced into a vehicle occupant compartment resulting in the leg portion of the trim panel bracket contacting the stop portion of the retention bracket.

11. The vehicle trim panel retention assembly of claim 10, wherein the contact between the leg portion and stop portion deters the inner door panel from being further displaced into the vehicle occupant compartment during the side impact collision.

12. The vehicle trim panel retention assembly of claim 9, wherein the retention bracket further comprises a body portion and an attachment leg, wherein the stop portion extends substantially vertically up from the body portion and the attachment leg extends substantially horizontally out from the body portion.

13. The vehicle trim panel retention assembly of claim 9, wherein the trim panel bracket further comprises a main body portion, wherein the leg portion extends substantially vertically down from the main body portion and the main body portion is elongate and extends along an inner surface of a top portion of the door trim panel.

14. The vehicle trim panel retention assembly of claim 9, wherein the retention bracket and trim panel bracket are positioned between the inner door panel and the door trim panel and are not visible from an occupant compartment of the vehicle.

15. A vehicle trim panel retention assembly, comprising:
an inner body panel including a retention bracket having an upward extending stop portion with free end; and
a trim panel mounted to the inner body panel and having a trim panel bracket with a downward extending leg portion, wherein a side impact collision causing the trim panel to displace into a vehicle occupant compartment results in the leg portion contacting the stop portion to prevent further trim panel displacement.

16. The vehicle trim panel retention assembly of claim 15, wherein the body panel is a door panel.

17. The vehicle trim panel retention assembly of claim 15, wherein the trim panel is a door trim panel.

18. The vehicle trim panel retention assembly of claim 15, wherein during the vehicle collision, the trim panel may be laterally displaced into the vehicle occupant compartment, causing the leg portion to contact the stop portion, to further prevent lateral displacement of the trim panel into the vehicle occupant compartment.

19. The vehicle trim panel retention assembly of claim 18, wherein the contact between the leg portion and the stop portion deters the trim panel from becoming detached from the inner body panel during the vehicle collision.

20. The vehicle trim panel retention assembly of claim 15, wherein the stop portion is positioned between the leg portion and the trim panel and the leg portion is positioned between the stop portion and the inner body panel.

\* \* \* \* \*